United States Patent
Wang et al.

(10) Patent No.: US 10,422,715 B2
(45) Date of Patent: Sep. 24, 2019

(54) GIS LEAK MONITORING METHOD BASED ON VIBRATION SIGNAL

(71) Applicants: STATE GRID JIANGSU ELECTRIC POWER COMPANY NANJING POWER SUPPLY COMPANY, Nanjing (CN); Hohai Univeristy, Nanjing (CN); STATE GRID JIANGSU ELECTRIC POWER COMPANY, Nanjing (CN)

(72) Inventors: Chunning Wang, Nanjing (CN); Honghua Xu, Nanjing (CN); Hongzhong Ma, Nanjing (CN); Kai Li, Nanjing (CN); Baowen Liu, Nanjing (CN); Yong Li, Nanjing (CN); Bingbing Chen, Nanjing (CN); Yangliu Cui, Nanjing (CN)

(73) Assignees: STATE GRID JIANGSU ELECTRIC POWER COMPANY NANJING POWER SUPPLY COMPANY, Nanjing (CN); STATE GRID JIANGSU ELECTRIC POWER COMPANY, Nanjing (CN); HoHai Univeristy, Nanjing (CN)

( * ) Notice: Subject to any disclaimer, the term of this patent is extended or adjusted under 35 U.S.C. 154(b) by 274 days.

(21) Appl. No.: 15/424,770

(22) Filed: Feb. 3, 2017

(65) Prior Publication Data

US 2017/0234758 A1 Aug. 17, 2017

(30) Foreign Application Priority Data

Feb. 3, 2016 (CN) .......................... 2016 1 0077756

(51) Int. Cl.
*G01M 3/24* (2006.01)

(52) U.S. Cl.
CPC .................................... *G01M 3/24* (2013.01)

(58) Field of Classification Search
CPC .......... G01N 2291/2634; G01N 29/14; G01N 2291/0422; G01M 3/243; G01M 3/24; G01M 3/005; G01M 3/00; G01H 1/00
(Continued)

(56) References Cited

U.S. PATENT DOCUMENTS 6,453,247 B1 * 9/2002 Hunaidi ................ G01M 3/243
702/51
6,567,006 B1 * 5/2003 Lander .................. G01M 3/243
340/605

(Continued)

OTHER PUBLICATIONS

English Translation, Jizhong et al., High-pressure GIS device vibration monitoring system, Sep. 2014.*

(Continued)

*Primary Examiner* — John Fitzgerald
*Assistant Examiner* — Truong D Phan
(74) *Attorney, Agent, or Firm* — Treasure IP Group, LLC

(57) ABSTRACT

The present invention relates to a leak detection method for GIS based on vibration signals and belongs to the technical field of apparatus for detecting or reacting mechanical or electrical troubles. The method is carried out by the following steps: 1) Installing a vibration sensor on each connecting flange of each gas-tight chamber of the GIS; 2) Starting the GIS; 3) Acquiring the vibration signals of sensors when the GIS operation is stable after starting; 4) Doing de-noise processing on the collected vibration signal; 5) Doing 4-layer wavelet packet decomposition of the vibration signal after noise reduction to obtain the energy proportion of the vibration signal in each frequency band; 6) Analyzing the energy proportion of the vibration signal in each frequency band in step 5), Then alarm to notify the relevant personnel. Return to step 3) until the fault has been solved.

5 Claims, 2 Drawing Sheets

(58) Field of Classification Search
USPC .................. 73/40.5 A, 592, 587; 702/56
See application file for complete search history.

(56) References Cited

U.S. PATENT DOCUMENTS

| | | | |
|---|---|---|---|
| 7,254,518 B2* | 8/2007 | Eryurek | G01F 1/363 |
| | | | 702/104 |
| 2007/0068225 A1* | 3/2007 | Brown | F16K 37/0075 |
| | | | 73/40.5 A |

OTHER PUBLICATIONS

Relative Energy and Entropy Based Wavelet Packet Decomposition of Images Cagri Kaplan, Omer Karal, Ilyas Cankaya, Proceedings of the IRES 21st International Conference, Amsterdam, Netherland, Dec. 25, 2015.

Multi-level basis selection of wavelet packet decomposition tree for heart sound classification Fatemeh Safara, Shyamala Doraisamy, Azreen Azman, Azrul Jantan, Asri Ranga Abdullah Ramaiah, Computers in Biology and Medicine 43 (2013) 1407-1414.

* cited by examiner

GIS LEAK MONITORING METHOD BASED ON VIBRATION SIGNAL

CROSS REFERENCE TO RELATED APPLICATION

This application claims priority to Chinese Application No. CN201610077756.5, filed on Feb. 3, 2016 entitled "A GIS leak monitoring method based on vibration signal." the Chinese Application is incorporated herein by reference in its entirety.

CROSS REFERENCE TO RELATED APPLICATION

This application claims priority to Chinese Application No. CN201610077756.5, filed on Feb. 3, 2016 entitled "A GIS leak monitoring method based on vibration signal." the Chinese Application is incorporated herein by reference in its entirety.

TECHNICAL FIELD OF THE INVENTION

The present invention relates to a method for monitoring gas leakage in a GIS and belongs to the technical field of apparatus for detecting or reacting mechanical or electrical faults.

BACKGROUND

GIS equipment, namely sulfur hexafluoride closed-type combination of electrical appliances, internationally known as the "gas-insulated switchgear" (Gas Insulated Switchgear) was born in the mid 1960s. It put substation primary equipments except transformer including circuit breakers, disconnectors, fast (ground) switch, current transformers, voltage transformers, arrester, bus (three phase or single phase), connecting pipe, transition elements and cable terminals in a fully enclosed metal shell. The medium for insulation and are quenching is 0.4~0.6 MPa SF6 gas. With the continuous maturing of GIS technology, the area and volume of GIS equipment are getting smaller and the operation is more and more reliable. The failure rate and maintenance workload of GIS put into operation early are obviously lower than other types of switchgear. Therefore, in the transformation of urban network, GIS has been widely used.

With the rapid increase of GIS usage in China in recent years and the increase of GIS operation period in early time, the failure rate of GIS has a tendency to increase and is far higher than the GIS accident rate requirements of no more than 0.1 intervals/100*years proposed by IET.

GIS is made up of a number of electrical devices, but the fault situation is not the same as the failure of individual electrical equipment. And the failure rate is far lower than the failure rate of independent electrical equipment. Long time in high pressure environment has become a main failure cause of a lot of GIS. GIS equipment need to go through strict process control to ensure the quality of the operation of GIS. But many parts of the process may be a potential risk of GIS failure. According to the failure occurred in the manufacturing and installation aspects. Although GIS has a high operational reliability, the long-running GIS will inevitably have material deterioration, as well as loose or deformation in the connecting components under electromotive force. The types of GIS faults are various, but the common faults are relatively concentrated.

According to the national GIS fault statistics, GIS fault can be divided into mechanical failure, insulation failure, secondary circuit failure, body leakage failure and other failures, in which insulation fault is the most common in partial discharge, and gas leakage is most common in mechanical failure. With the GIS running for a long time, under the influence of long-term vibration, the flange connection will loosen to cause the gas chamber to have the air leakage; At the same time, deterioration of the pot-type insulator will also lead to gas leakage. Once the live gas leakage part is no longer completely enclosed in the inert SF6 gas, the external contact will be affected by the external environment, and the reliability will be reduced. Therefore, real-time monitoring of gas leaks in GIS gas chambers is of great significance for timely detection of GIS anomalies and ensuring the normal operation of GIS.

At present, the status monitoring for GIS mainly focuses on monitoring the partial discharge fault of GIS, and forms many methods such as UHF method, ultrasonic method, gas analysis method and so on. And the monitoring technology is more and more mature. The researches on GIS mechanical faults are mainly focused on the monitoring of GIS actuators such as circuit breakers, isolating switches, earthing switches and so on. So far, GIS gas leak monitoring rely mainly on gas pressure of gauge gas chamber. However, gas pressure gauges are insensitive to small gas changes, and gas leakage has become more severe when gas pressure gauges change parameters. In addition, the current gas pressure gauge is still dependent on manual reading to found abnormal. Real-time is poor and efficiency is very low. Therefore, it is necessary to find a more reliable and simple gas leak detection method.

SUMMARY OF THE INVENTION

A technical problem to be solved by the present invention is to provide a GIS leak detection method based on the vibration signal with high sensitivity, timely In order to solve the above-mentioned problems, the present invention provides a gas leakage monitoring method based on a vibration signal, which performs the following steps:

1) A vibration sensor is mounted on each connection flange of each of the gas-tight chambers of the GIS;
2) Starting the GIS;
3) When the GIS operation is stable after the start, the vibration signal of each vibration sensor is collected. The sampling frequency is 12 kHz, and the sampling time is 5 seconds.
4) Doing de-noise processing on the collected vibration signal;
5) Doing 4-layer wavelet packet decomposition of the vibration signal after noise reduction to obtain the energy proportion of the vibration signal in each frequency band;
6) Analyzing the energy proportion of the vibration signal in each frequency band in step 5), if the proportion of energy in the first frequency band exceeds 80%, the GIS can be judged to be normal and return to step 3) to continue to monitor the GIS; if the proportion of energy in the first frequency band does not exceed 80%, the GIS is abnormal. Then alarm to notify the relevant personnel. Return to step 3) until the fault has been solved;

Calculating the sum of energy proportion in the second frequency band, the third frequency band and the fourth frequency band.

If the proportion of energy is more than 60%, then the gas chamber of the GIS has a slight leakage;

If the sum of energy proportion in the second frequency band, the third frequency band and the fourth frequency band is not more than 60% and energy proportion in the seventh band of energy is more than 40%, the gas chamber of the GIS has a serious leakage;

If the sum of energy proportion in the second frequency band, the third frequency band and the fourth frequency band did not exceed 60% and energy and the gas chamber of the GIS do not leak.

The improvement of the above-mentioned technical scheme is that the first frequency band is 400-800 Hz. The second frequency band is 1200-1600 Hz. The third frequency band is 800-1200 Hz. The fourth frequency band is 2400-2800 Hz. And the seventh frequency band is 2000-2400 Hz.

The improvement of the technical solution above is that vibration sensor is installed on the connecting flange on the surface of the flange bolts as mentioned in step 1).

The improvement of the technical solution described above is that each of the vibration sensors is located at the same relative position with respect to the flange surface.
The invention has the beneficial effects that the invention monitors the gas leakage in the gas chamber of the GIS by monitoring the vibration signal, which provides a method with high sensitivity, saves a large amount of artificial copy and achieves single-person multi-device management.
1) After analyzing the collected vibration signal by wavelet packet decomposition, analyzing the proportion of energy in different frequency bands to judge the current situation in GIS gas chamber whether leak, the leak is serious and so on, which solves the man-made manometer error.
2) If everything is normal, the method will always be on the GIS for long-term monitoring and provides a means of real-time effectiveness.

BRIEF DESCRIPTION OF THE DRAWINGS

The present invention will be further described below with reference to the accompanying drawings.

EXAMPLES

Figure 1:
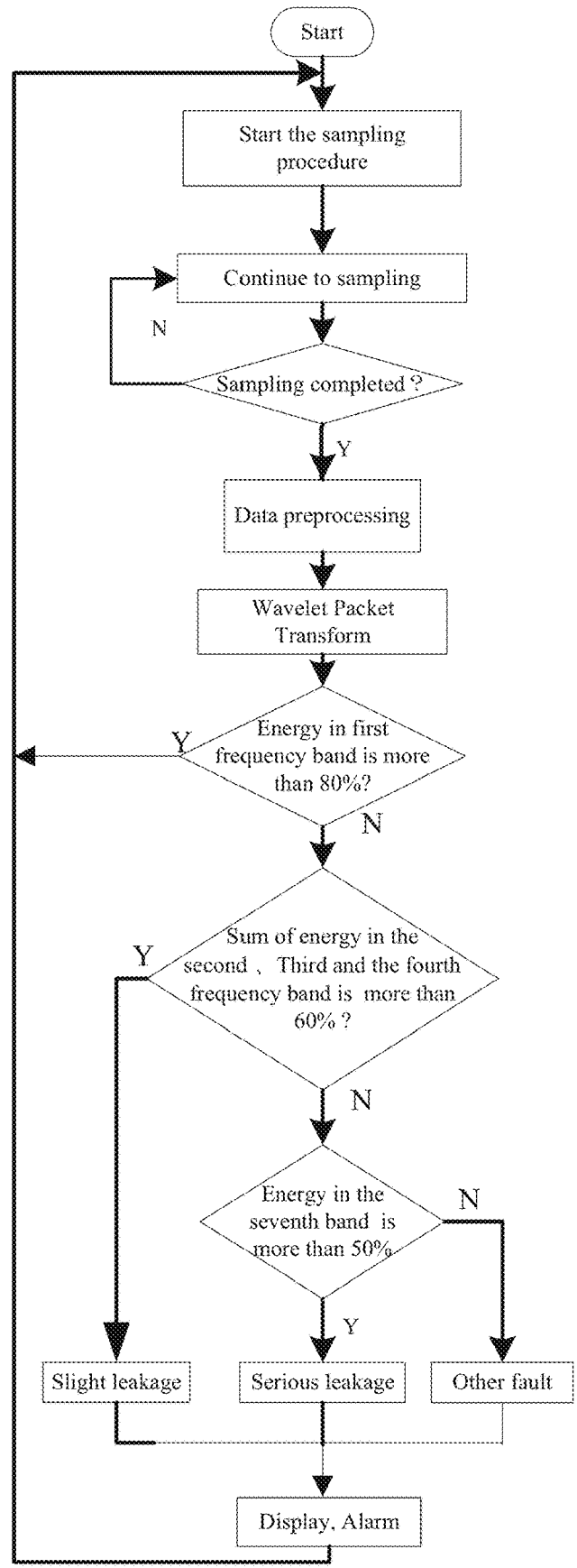
FIG. 1 is a flowchart of a GIS leak detection method based on a vibration signal.
Figure 2:
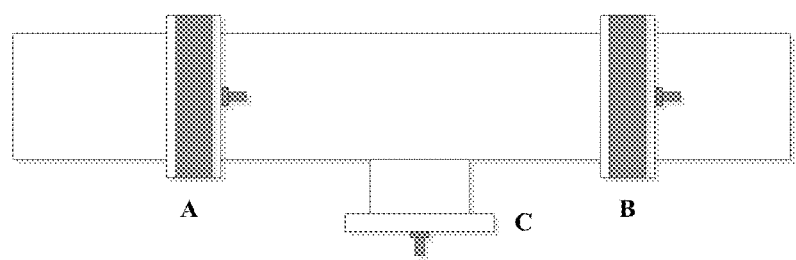
FIG. 2 is a schematic diagram of a mounting manner of a vibration sensor in a throttle chamber of a GIS.
Figure 3:
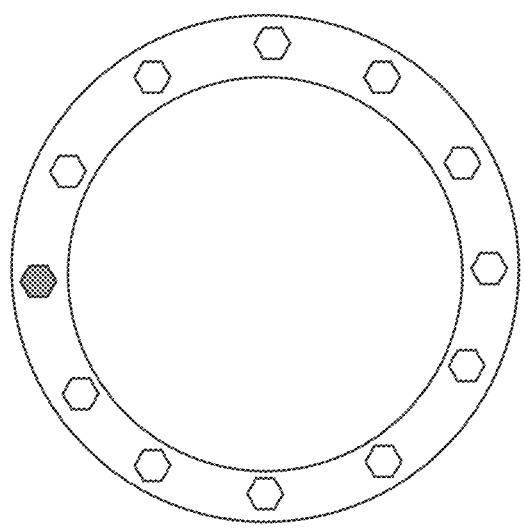
FIG. 3 is a schematic view showing the mounting positions of the sensors of FIG. 2.

A method for monitoring leakage of gas based on a vibration signal according to the present embodiment of the invention comprises the steps of:

1) A vibration sensor is attached to each connection flange of each of the gas-tight chambers of the GIS and mounted on a bolt on the flange surface of the connection flange, and as shown in FIG. 3, The sensors are installed in the flange surface of the $\pi/4$ circumference position (black in the figure), in order to improve score consistency and comparability of the measured vibration signal;

2) Starting the GIS;

3) When the GIS operation is stable after the start, the vibration signal of each vibration sensor is collected. The sampling frequency is 12 kHz, and the sampling time is 5 seconds.

4) Doing de-noise processing on the collected vibration signal;

5) The de-noise vibration signal is processed by four-level wavelet packet decomposition to obtain the energy proportion of the vibration signal in each frequency band;

6) Analyzing the energy proportion of the vibration signal in each frequency band in step 5), if the proportion of energy in the first frequency band exceeds 80%, the GIS can be judged to be normal and return to step 3) to continue to monitor the GIS; if the proportion of energy in the first frequency band does not exceed 80%, the GIS is abnormal. Then alarm to notify the relevant personnel. Return to step 3) until the fault has been solved;

Calculating the sum of energy proportion in the second frequency band, the third frequency band and the fourth frequency band;

If the proportion of energy is more than 60%, then the gas chamber of the GIS has a slight leakage;

If the sum of energy proportion in the second frequency band, the third frequency band and the fourth frequency band is not more than 60% and energy proportion in the seventh band of energy is more than 40%, the gas chamber of the GIS If the sum of energy proportion in the second frequency band, the third frequency band and the fourth frequency band did not exceed 60% and energy proportion in the seventh band of energy is not more than 40%, the GIS operation is abnormal and the gas chamber of the GIS do not leak.

The first frequency band of the present embodiment is 400-800 Hz. The second frequency band is 1200-1600 Hz. The third frequency band is 800-1200 Hz. The fourth frequency band is 2400-2800 Hz. The seventh frequency band is 2000-2400 Hz. And the rest of the band is shown in Table 1.

The vibration sensor of the present embodiment is a ferromagnetic vibration sensor to improve the fit between the vibration sensor and the flange surface and to reduce the measurement error.

TABLE 1 wavelet packet 4-layer decomposition of each node band distribution table

| Node | Frequency bands/Hz | Node | Frequency bands/Hz | Node | Frequency bands/Hz | Node | Frequency bands/Hz |
|---|---|---|---|---|---|---|---|
| (4,0) | 0-400 | (4,4) | 2400-2800 | (4,8) | 6000-6400 | (4,12) | 3200-3600 |
| (4,1) | 400-800 | (4,5) | 2800-3200 | (4,9) | 5600-6000 | (4,13) | 3600-4000 |
| (4,2) | 1200-1600 | (4,6) | 1600-2000 | (4,10) | 4800-5200 | (4,14) | 4400-4800 |
| (4,3) | 800-1200 | (4,7) | 2000-2400 | (4,11) | 5200-5600 | (4,15) | 4000-4400 |

In usage, the GIS vibration sensors are installed on the connecting flange of the throttle chamber. The vibration signals are acquired by monitoring. Pre-denoise processing is done and is dealt by industrial PC.

The present invention is not limited to the above-described embodiments. The technical solution formed by the equivalent substitution is within the scope of the present invention.

Wavelet packet decomposition is a well-known technology, and can also be called a wavelet packet or a subband tree and an optimal subband tree structure. The inventive concept is to use the analysis tree to represent the wavelet packet, that is, to analyze the details of the input signal by using multiple iterations of wavelet transform. Wavelet packet analysis is an extension of wavelet analysis. The basic idea is to concentrate the information represented by energy, find the information pattern in the details, and filter out the rules to provide a more sophisticated analysis method for the signal. It divides the frequency band into multiple layers, further decomposes the high frequency part without multi-resolution analysis, and can adaptively select the corresponding frequency band according to the characteristics of the analyzed signal to match the signal spectrum, thereby improving the time-frequency resolution.

Wavelet packet transform decomposes a signal into a set of bases (nodes) and provides opportunities to select an appropriate set of these bases for feature extraction. In this application, referring to table 1, a four-level wavelet packet decomposition is utilized and it is divided into 16 nodes. Simply put, the total vibration signals are analyzed by first dividing into 16 nodes, each node correlates to a frequency-range set forth in the table 1.

We claim:

1. A GIS leak detection method based on vibration signals is characterized by following steps:
   1) providing a GIS having a plurality connecting flanges, installing only one magnetic vibration sensor on each connecting flange of each gas-tight throttle chamber of the GIS, and installing each vibration sensor on a surface of one of flange bolts for each connecting flange; and each vibration sensor is placed at a same relative position with respect to its corresponding surface of the connecting flange;
   2) initiating the GIS;
   3) collecting vibration signals by the vibration sensors after the start operation of the GIS, using a sampling frequency of 12 kHz, and sampling time of 5 seconds;
   4) doing de-noise processing on the collected vibration signals;
   5) doing 4-layer wavelet packet decomposition of the vibration signals after the de-noise processing, to obtain an energy proportion of the vibration signals in each frequency band, a total being all energy proportion in each frequency band combined;
   6) analyzing the energy proportion of the vibration signals in each frequency band in step 5) returning to step 3) to continue to monitor the GIS when the proportion of energy in a first frequency band exceeds 80% of the total, the GIS is decided to be normal; alarming to notify relevant personnel when the proportion of energy in the first frequency band does not exceed 80% of the total, and the GIS is abnormal, return to step 3) after a fault has solved; wherein the step of the GIS is abnormal is determined by calculating sum of energy proportion in a second frequency band, a third frequency band and a fourth frequency band and determining leakage condition according to the following conditions: if the proportion of energy is more than 60% of the total, the gas chamber of the GIS has a slight leakage; if the sum of energy proportion in the second frequency band, the third frequency band, and the fourth frequency band is not more than 60% of the total and energy proportion in a seventh band of energy is not more than 40% of the total, the gas chamber of the GIS has a serious leakage; and if the sum of energy proportion in the second frequency band, the third frequency band, and the fourth frequency band did not exceed 60% of the total and energy proportion in the seventh band of energy is not more than 40% of the total, the operation of GIS is abnormal and the gas chamber of the GIS does not leak, wherein the 4-layer wavelet packet decomposition of the vibration signals means to divide the vibration signals to 16 nodes representing continuous frequency ranges from 0-4400 Hz.

2. The GIS-based leak monitoring method based on vibration signals as claimed in claim 1, characterized in that the first frequency band is 400-800 Hz, the second frequency band is 1200-1600 Hz, the third frequency band is 800-1200 Hz, the fourth frequency band is 2400-2800 Hz, and the seventh frequency band is 2000-2400 Hz.

3. The GIS-based leak monitoring method based on vibration signals as claimed in claim 1, wherein the step of installing each vibration sensor on a surface of one of flange bolts for each connecting flange further includes that installing each vibration sensor on the flange bolt at $\pi/4$ circumference position of the flange.

4. An integrated leak detection tool to be installed on a GIS system, for use to detect leak in connecting flanges of the GIS, comprising:
   a plurality of vibration sensors installed on a plurality of connecting flanges of the GIS system, wherein only one vibration sensor is installed on a surface of one of flange bolts of each connecting flange of each gas-tight throttle chamber of the GIS, and each vibration sensor is placed at a same relative position with respect to its corresponding surface of the connecting flanges;
   a computer readable storage medium, having stored thereon a computer program, said program arranged to operate a processor to perform a method of:
   3) collecting vibration signals by the vibration sensors after a start operation of the GIS using a sampling frequency of 12 kHz, and sampling time of 5 seconds;
   4) doing de-noise processing on the collected vibration signals;
   5) doing 4-layer wavelet packet decomposition of the vibration signals after the de-noise processing, to obtain an energy proportion of the vibration signals in each frequency band, a total being all energy proportion in each frequency band combined;
   6) analyzing the energy proportion of the vibration signals in each frequency band in step 5) returning to step 3) to continue to monitor the GIS when the proportion of energy in a first frequency band exceeds 80% of the total, the GIS is decided to be normal; alarming to notify relevant personnel when the proportion of energy in the first frequency band does not exceed 80% of the total, and the GIS is abnormal, return to step 3) after a fault has solved; wherein the step of the GIS is abnormal is determined by calculating sum of energy proportion in a second frequency band, a third frequency band and a fourth frequency band and determining leakage condition according to the following conditions: if the proportion of energy is more than 60% of the total, the gas chamber of the GIS has a slight leakage; if the sum of energy proportion in the second frequency band, the third frequency band, and the fourth frequency band is not more than 60% of the total and energy proportion in a seventh band of energy is not more than 40% of the total, the gas chamber of the GIS has a serious leakage; and if the sum of energy proportion in the second frequency band, the third frequency band, and the fourth frequency band did not exceed 60% of the total and energy proportion in the seventh band of energy is not more than 40% of the total, the operation of GIS is abnormal and the gas chamber of the GIS does not leak.

5. The integrated leak detection tool to be installed on a GIS system of claim 4, wherein each vibration sensor is installed on the flange bolt at π/4 circumference position of the flange.

* * * * *